United States Patent

Robinson et al.

[11] Patent Number: 5,856,999
[45] Date of Patent: Jan. 5, 1999

[54] APPARATUS AND METHOD FOR DATA TRANSMISSION ON BONDED DATA CHANNELS OF A COMMUNICATIONS NETWORK UTILIZING A SINGLE SERIAL COMMUNICATIONS CONTROLLER

[75] Inventors: Alan Ray Robinson, Decatur; Timothy Lee Williams, Harvest; John Charles Richards, Union Grove, all of Ala.

[73] Assignee: Motorola Inc., Schaumburg, Ill.

[21] Appl. No.: 593,591

[22] Filed: Jan. 24, 1996

[51] Int. Cl.$^6$ .................................................. H04B 1/38
[52] U.S. Cl. ........................ 375/221; 375/222; 370/248; 370/249
[58] Field of Search ................................. 375/221, 222, 375/219, 363; 371/20.1, 20.4, 20.5; 370/241, 242, 248, 249

[56] References Cited

U.S. PATENT DOCUMENTS

| | | | |
|---|---|---|---|
| 4,769,807 | 9/1988 | Niwa et al. | 371/20.5 |
| 4,980,887 | 12/1990 | Dively et al. | 371/20.5 |
| 5,010,544 | 4/1991 | Chang et al. | 371/20.5 |
| 5,210,740 | 5/1993 | Anzai et al. | 371/20.5 |
| 5,422,876 | 6/1995 | Turudic | 371/20.5 |
| 5,442,621 | 8/1995 | Ise et al. | 371/20.5 |

Primary Examiner—Jason Chan
Assistant Examiner—Congvan Tran
Attorney, Agent, or Firm—Nancy R. Gamburd

[57] ABSTRACT

The apparatus (101) and method provide for data transmission capability on bonded data channels of a communications network (104), such as an integrated services digital network, utilizing a single serial communication controller ("SCC") for the bonded data channels. The apparatus (101) includes an interface transceiver (210), interface circuitry (220), and an integrated multiprotocol processor (200). The integrated multiprotocol processor (200) contains an SCC (420) which may be utilized for data transmission on bonded data channels, with other SCCs (430, 440) available for use on other channels. The apparatus and method provide for proper data alignment of primary (or master) channel data and secondary channel data on the bonded channels, through the same SCC, through utilization of a predetermined information pattern transmitted in a loopback mode (810, 820) of the interface transceiver (210), to the receiver of the SCC (830). The received information pattern is compared to the transmitted, predetermined information pattern (850). If the patterns do not match, the data for transmission is realigned for transmission in proper time division multiplexed slots for the primary and secondary channels of the bonded channel (850,860). The interface transceiver (210) may then be reconfigured for a transmission mode (845), and data transmission activities may commence.

21 Claims, 3 Drawing Sheets

APPARATUS AND METHOD FOR DATA TRANSMISSION ON BONDED DATA CHANNELS OF A COMMUNICATIONS NETWORK UTILIZING A SINGLE SERIAL COMMUNICATIONS CONTROLLER

FIELD OF THE INVENTION

This invention relates in general to data communications devices and, more specifically, to an apparatus and method for data transmission on bonded data channels of a communications network utilizing a single serial communications controller.

BACKGROUND

Presently, a major portion of point-to-point data communication between data terminal equipment ("DTEs" or terminals), such as personal computers and workstations, is implemented using data communication devices ("DCDs"), such as modems, over analog communications systems, such as the public switched telephone network ("PSTN"). With increasing demand for data transmission, such as with the advent of videoconferencing, there has been a corresponding demand for greater data transmission capability and greater data transmission bandwidth. With this demand for greater data bandwidth, typically unavailable over the PSTN, there has been an increase in use of digital communications networks for voice and data transmission, such as use of the Integrated Services Digital Network ("ISDN"), which have greater data bandwidth capability. ISDN has evolved to provide for end-to-end digital connectivity, and details of ISDN service are described in standards such as the I-Series Recommendations of the International Telecommunications Union ("ITU").

An ISDN Basic Rate Interface ("BRI") service currently available to end users consists of three time division multiplexed channels, comprising two B channels operating at 64 kbps (kilobits per second), which may be used for voice or data, and one D channel operating at 16 kbps, which may be used for packetized data and/or control information (i.e., call set-up and shut down), with additional bandwidth utilized for framing, synchronization, and other overhead bits. An apparatus such as an ISDN terminal adapter ("TA") may be used for transferring data between DTEs (such as personal computers, terminals, local area networks, video conferencing equipment and similar equipment) using BRI service. While two B (data) channels (each operating at 64 kbps) are sufficient for many applications, there are applications in which one data channel having a higher data bandwidth is preferable. As a consequence, a process known as "bonding" (Bandwidth ON Demand) has evolved, in which two or more channels (each having lesser bandwidth) are combined into one channel having greater bandwidth. For example, it may be desirable to combine the two, 64 kbps B channels to obtain a single bonded channel operating at 128 kbps. The 128 kbps channel formed by bonding may then be used to transfer data between two DTEs.

A local terminal adapter and a remote terminal adapter having bonding capability in accordance with an ITU Recommendation, *Interoperability Requirements for N×56/ 64 kbit/s Calls*, Version 1.0, Sep. 1, 1992, by the Bandwidth ON Demand Interoperability Group, may be used with BRI service to obtain a bonded connection. The terminal adapters may be comprised of a variety of electrical and electronic components and circuits, including one or more integrated multiprotocol processors ("IMPs") (such as a Motorola MC68302), and an interface transceiver (such as a Motorola MC145572 ISDN U-Interface Transceiver). The IMP may have a processor and one or more serial communications controllers ("SCCs") to transfer serial data to and from the processor. The processor utilizes processor formatted data, such as bytes of data, which may be available for processing on a parallel data bus. Typically, however, serial data is transferred between the IMP and the various DTEs, the interface transceivers, and other equipment. As a consequence, in a typical terminal adapter having bonding capability, four serial data streams require SCC servicing (serial to parallel conversion and parallel to serial conversion): the DTE data, each of the two B channels, and the D channel.

One prior art apparatus and method to provide for the four data stream conversions takes advantage of a resource sharing feature of an IMP, such as the Motorola MC68302, which has several SCCS. Because each MC68302 has three SCCs, a first IMP and a second IMP may be coupled or combined to provide six SCCs which are available to process the data streams. Although there are two extra or unused SCCs of the second IMP, the combined IMPs may have greater processing power for some applications, as the memory and other elements of a second IMP may be utilized. While this methodology provides for the four data stream conversions needed for a terminal adapter to have bonding capability, the addition of a second IMP is expensive, requires additional space and connections on a printed circuit board, and adds to the overall cost to manufacture and purchase a terminal adapter.

A second prior art method to provide for the four data stream conversions has been suggested in Appendix D of the MC68302 Users Manual, and may require only one MC68302 IMP. As alluded to in the Users Manual, this method would allow using one SCC to service both B channels, and would rely on synchronizing an enable transmitter command with a frame timing pulse. Although the Users Manual does not suggest or describe how to coordinate such synchronization, those skilled in the art may consider sending frame timing pulses to an interrupt pin on the processor (IMP) to initiate a timing routine. By starting the timing routine with such an interrupt signal, data bytes from a B channel possibly could be inserted at a predetermined time in a framing structure utilized by an SCC. Athough this potential method may have merit, interrupt pins may be required for higher priority features of the terminal adapter and therefore may be unavailable for use in bonding the B channels. In addition, additional processor code and time would be required to implement such a timing routine, and these additional resources may also be unavailable. This possible method may also be prone to difficulties resulting from potential interrupt latencies.

Accordingly, a need has remained to provide SCC servicing of four serial data streams for an ISDN bonded connection, while simultaneously reducing the number of SCCs needed to accomplish the ISDN bonded connection. In addition, a need has remained to accomplish this reduction in SCC requirements with a minimal complexity and expense, while also preferrably using currently available IMPs.

DETAILED DESCRIPTION OF THE INVENTION

As mentioned above, in a typical bonded ISDN connection, four serial data streams must be converted to and from processor formatted (parallel) data. One of the serial data streams is transferred between the IMP and the data terminal equipment, and may require a dedicated SCC, also referred to as a terminal SCC. Another of the serial data streams is utilized for the D channel, used for network signaling, and also typically has a dedicated SCC, also referred to as a signaling SCC. The data channels (also known as B channels) of the bonded connection may each have a dedicated SCC or, in accordance with the present invention, may utilize one SCC.

While the data (B) channels are bonded, however, each channel may not be in time synchronization with the other, and data in each channel may be routed through different physical channels and may also arrive at different times at the destination location. As a consequence, it is necessary for each channel to be properly identified or designated during call set up, so that the data transmitted may be properly reassembled or sorted at the destination location. As a bonded connection is established during call set up, therefore, a first B ("$B_1$") channel will be designated as a primary or master channel, and a second B ("$B_2$") channel will be designated as a secondary or slave channel (or, equivalently, vice-versa). For ease of explanation, the data designated for the primary (master) B channel may be correspondingly referred to as $B_1$ data, and the data designated for the secondary (slave) B channel may be correspondingly referred to as $B_2$ data. As discussed in greater detail below, either of the primary or the secondary B channels ($B_1$ or $B_2$) may be in the first or the second B channel time slots of the network channel.

As the various ISDN channels are time division multiplexed, a bonded connection is comparatively straightforward when a separate SCC is available for each channel. Following a synchronization pulse, with a transmit enable, each SCC is configured to properly place data in the corresponding time slot designated for that channel. For example, an SCC configured for the first B channel time slot places corresponding $B_1$ (or $B_2$) data (depending upon whether the first B channel time slot has been designated primary or secondary) into the data stream immediately following the synchronization pulse. An SCC configured for the D channel waits for a duration of eight bits following the synchronization pulse to place signalling information and other data into the data stream, while an SCC configured for the second B channel time slot waits a duratation of ten bits following the synchronization pulse to place corresponding $B_2$ (or $B_1$) data into the data stream. A problem arises in the utilization of a single SCC for both B channels, as the SCC typically will simply place the first available byte of data into the first available B channel (or slot) following the synchronization pulse, without regard to whether the data is designated as primary ($B_1$) or secondary ($B_2$) data. Because there is an effectively equal likelihood that $B_1$ data will be placed erroneously in the $B_2$ channel (and $B_2$ data will be placed erroneously in the $B_1$ channel), compared to the likelihood that the $B_1$ and $B_2$ data will be properly placed in their designated channels, there is a corresponding potential for confusion of the $B_1$ and $B_2$ data at the destination location. This problem has heretofore precluded utilization of a single SCC for both bonded B channels. The apparatus and method of the present invention provides a solution to this problem and provides for proper data alignment, such that $B_1$ data is properly placed into the $B_1$ channel, and $B_2$ data is properly placed into the $B_2$ channel, while utilizing a single SCC for the bonded channels.

Figure 1:
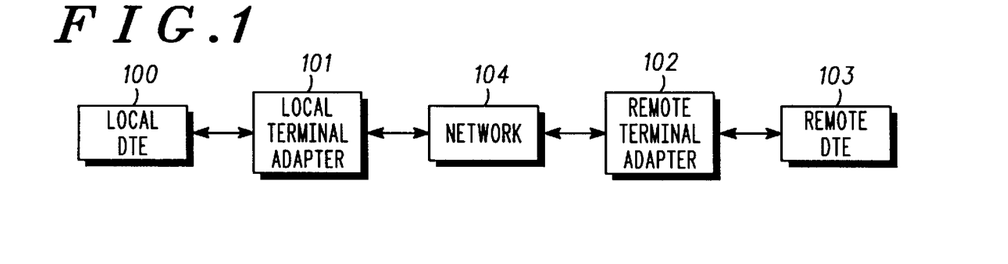
FIG. 1 is a block diagram illustrating a digital data communications system in accordance with the present invention.

FIG. 1 is a block diagram illustrating a digital data communications system in accordance with the present invention. A local DTE 100 is coupled to a local terminal adapter 101 and, in this case, the local DTE 100 initiates a request for a bonded connection through the local terminal adapter 101. (Correspondingly, the remote DTE 103, through the remote terminal adapter 102, could also initiate a request for a bonded connection.) When this service request from the local terminal adapter 101 is received by a central office switch (of the ISDN network 104), a process for setting up the bonded call is initiated. The central office switch (of the ISDN network 104), using a signaling (or D) channel, connects the remote terminal adapter 102 with the local terminal adapter 101 via a first B ($B_1$) channel. The local terminal adapter 101 and remote terminal adapter 102 designate the first B channel as a primary or master channel and, as mentioned above, further indicate that the master channel will be inserted in either a first or second B channel time slot in the network framing structure. The local terminal adapter 101 further establishes a second B channel connection to the remote terminal adapter 102. When a valid bonded connection is complete, data may be transferred between the remote DTE 103 and the local DTE 100. As indicated above and as explained in greater detail below, in accordance with the present invention, transmit data in the local terminal adapter (and the remote terminal adapter) will be aligned in order to establish a proper bonded connection, for $B_1$ data to be properly placed in the $B_1$ designated time slot (or channel) and for $B_2$ data to be properly placed in the $B_2$ designated time slot (or channel).

Figure 2:
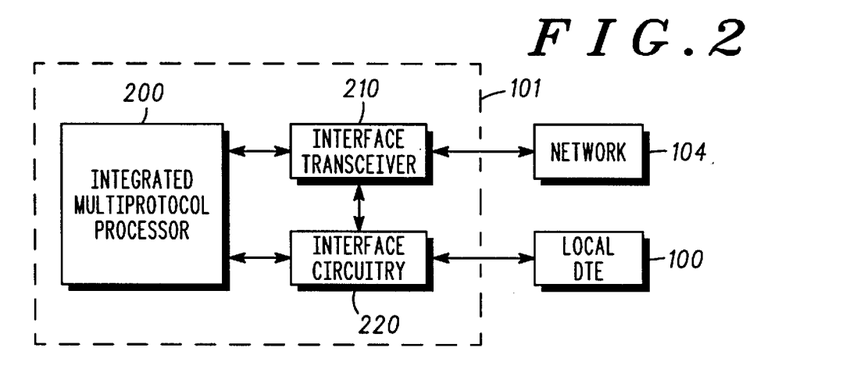
FIG. 2 is a block diagram illustrating a terminal adapter in accordance with the present invention.

FIG. 2 is a block diagram illustrating the elements of a terminal adapter, such as local terminal adapter 101, in accordance with the present invention. An integrated multiprotocol processor ("IMP") 200, such as a Motorola MC68302, is coupled to an interface transceiver 210, such as a Motorola MC145572, and further coupled to interface circuitry 220. The local DTE 100, using a connector such as an RS232 connector, may transfer data and information to and from the IMP 200 through the interface circuitry 220. The interface circuitry 220 is well known in the art and accordingly is not described in detail herein, and typically includes transformers, signaling conditioning circuits, power supply circuits, and electronic circuitry to activate electronic components on the printed circuit board of the terminal adapter 101. The interface transceiver 210 is a physical interface unit between the IMP 200 and physical communications lines (such as twisted pair network lines) coming from the central office switch of the ISDN network 104.

Figure 3:
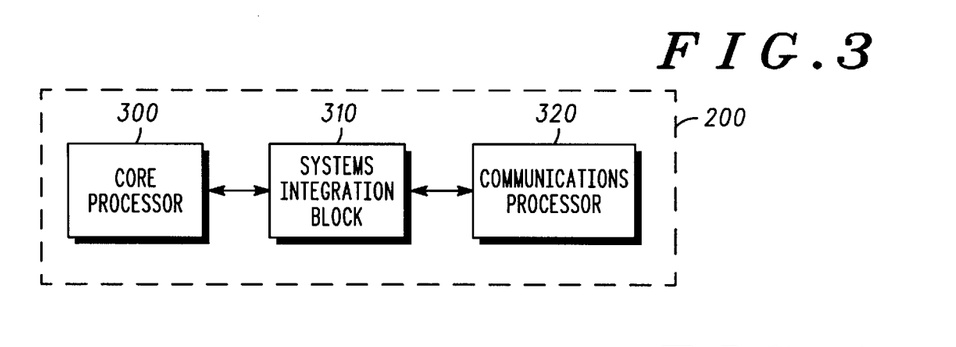
FIG. 3 is a block diagram illustrating an integrated multiprotocol processor in accordance with the present invention.

FIG. 3 is a block diagram illustrating an integrated multiprotocol processor 200 in accordance with the present invention. As shown in FIG. 3, the IMP 200, such as a Motorola MC68302, includes a core processor block 300 and a communications processor block 320, which may be coupled to each other via a systems integration block 310, as described in the MC68302 Users Manual. The core processor 300, such as that of the MC68302, typically has 16-bit and 32-bit general purpose registers, a 32-bit program counter, and an 8-bit condition code register, as elements for supporting the instruction set of a microprocessor. The systems integration block 310 typically contains an independent DMA controller, an interrupt controller, parallel I/O ports, three timers, four programmable chip selects, a systems controller and a DRAM refresh controller. The communications processor 320 in accordance with the present invention is illustrated in FIG. 4.

Figure 4:
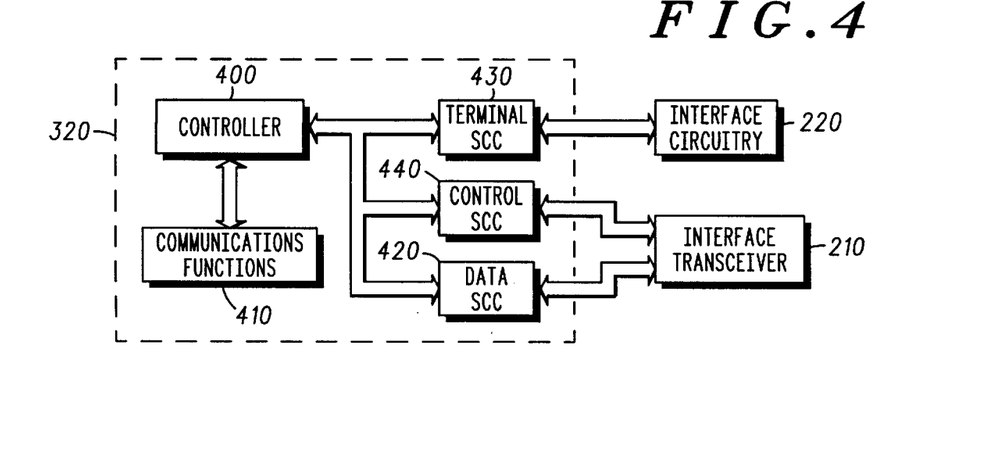
FIG. 4 is a block diagram illustrating a communications processor in accordance with the present invention.

FIG. 4 is a block diagram illustrating a communications processor 320 in accordance with the present invention. The communications processor 320 has a controller 400 for controlling three serial communication controllers, SCCs 420, 430 and 440, and for controlling other functions included in communications functions block 410. The communications functions block 410 may include, for example, in the MC68302, six serial direct memory access channels, a command set register, and a serial channel physical interface. The three SCCs 420, 430 and 440 are each independent, full-duplex serial communication controllers, and each typically supports a variety of data communication protocols. SCC 430, also referred to as terminal SCC 430, couples signals to and from the local DTE 100 (via interface circuitry 220) to the controller 400, allowing for data and command transfers to and from the local DTE 100. SCC 440, also referred to as control SCC 440, is coupled to the controller 400 and further coupled via the interface transceiver 210 to the communications line (physical channel) from the central office switch of the ISDN network 104, and is utilized for transferring control information between the service provider and the local terminal adapter 101. SCC 420, also referred to as data SCC 420, is also coupled to both the controller 400 and the communications line from the central office switch of the ISDN network 104 (also via the interface transceiver 210), and is utilized for transferring data between the local terminal adapter 101 and the remote terminal adapter 102 over the communications line or channel of the ISDN network 104.

Figure 5:
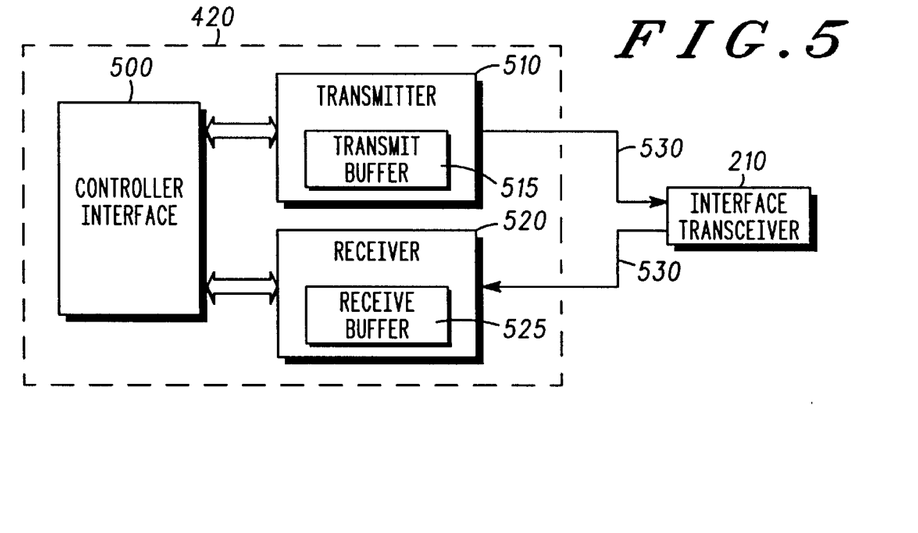
FIG. 5 is a block diagram illustrating a serial communications controller in accordance with the present invention.

FIG. 5 is a block diagram illustrating a data serial communications controller 420 capable of supporting a bonded ISDN connection in accordance with the present invention. A transmitter 510 and a receiver 520 are coupled to the interface transceiver 210 via a serial communications port 530. The transmitter 510 and receiver 520 are further coupled to a controller interface 500 for transfer of commands and data to and from the controller 400. In the preferred embodiment, the transmitter 510 has a transmit buffer (or memory) 515 and the receiver 520 has a receive buffer (or memory) 525, each serving as transient or temporary memory (storage) elements. The transmit buffer 515 and the receive buffer 525 each may be mapped or configured as the buffer 700 illustrated in FIG. 7, and many equivalent memory structures and configurations may also be utilized, provided simply that the data may be held in an ordered fashion in the memory structure. The operation of the data serial communications controller 420, in accordance with the present invention, is explained in greater detail below.

Figure 6:
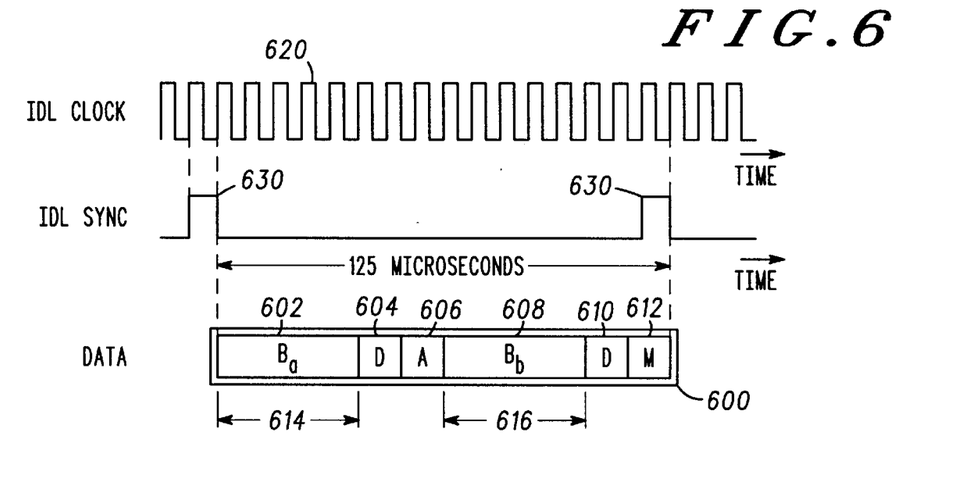
FIG. 6 is a diagram illustrating timing signals and a frame structure utilized by a serial communications controller in accordance with the present invention.

FIG. 6 is a diagram illustrating timing signals and a typical frame structure utilized by a serial communications controller in accordance with the present invention. A typical ISDN frame 600 has bits arranged in a $B_aDAB_bDM$ sequence, in which data byte $B_a$ (byte 602) and data byte $B_b$ (byte 608) are each eight bits, and D bits (bits 604 and 610), A bit (bit 606), and M bit (bit 612) are each one bit, for a total of 20 bits per ISDN frame 600. One byte (eight bits) of data of the B channels are inserted twice in the frame 600, one byte in time slot one (614) and one byte in time slot two (616), as mentioned above, in response to an IDL synchronization (sync) pulse 630, and are aligned in accordance with the IDL clock signal 620. The D, A and M bits are also inserted in their respective assigned slots in response to the IDL sync pulse and are also aligned in accordance with the IDL clock signal 620. In a valid bonded connection, for example when the master channel has been designated for the first time slot $B_a$, master channel data ($B_1$ data) must be inserted in the first ($B_a$) time slot 614, with $B_2$ data inserted in the second ($B_b$) time slot 616 (with opposite correspondence when the master channel has been designated for the second time slot 616, $B_b$). If master channel data is not inserted correctly, data cannot be transferred and a disconnection will generally occur.

As mentioned above, a problem arises in the utilization of a single SCC for both B channels, as an SCC will place the first available byte of data into the first available B channel time slot (such as slot 614) following the synchronization pulse 630, without regard to whether the data is designated as $B_1$ or $B_2$ data, largely because the transmit enable command from the processor 400 is not necessarily synchronized or coordinated with the synchronization pulse. Because there is an effectively equal likelihood that $B_1$ data will be placed erroneously in the time slot (or channel) designated for $B_2$ data (and $B_2$ data will be placed erroneously in the time slot (or channel) designated for $B_1$ data), compared to the likelihood that the $B_1$ and $B_2$ data will be properly placed in their designated time slots (or channels), there is a corresponding potential for confusion of the $B_1$ and $B_2$ data at the destination location. The apparatus and method of the present invention provides a solution to this data alignment problem, such that $B_1$ data is properly placed into the time slot (channel) designated for $B_1$ data, and $B_2$ data is properly placed into the time slot (channel) designated for $B_2$ data, while utilizing a single SCC (such as data SCC 420).

As explained in greater detail below, prior to data transmission, a predetermined information (or test) pattern is stored in particular locations of the transmit buffer 515 of the data SCC 420. The interface transceiver 210 is configured in a loopback mode, such that it also receives the data it transmitted (in this case, the predetermined information pattern). The data as received, referred to as a received information pattern and stored in the receive buffer 525, is compared with the known, predetermined information pattern to determine whether the two patterns match each other. If the patterns do not match, then the data for transmission is not properly aligned given how the SCC 420 is inserting the data into the data stream, i.e., the pattern mismatch indicates that a data byte, such as $B_1$ data, has not been correctly inserted into the $B_1$ channel (time slot), and that a data byte, such as $B_2$ data has not been correctly inserted into the $B_2$ channel (time slot). As indicated by the pattern mismatch, the transmission data should be realigned prior to any transmission of actual data. In the preferred embodiment, this realignment may occur either by creating an alternate data alignment, such as by switching the memory locations of $B_1$ and $B_2$ data, or by shifting the data into a correct alignment. If the patterns do match, however, then data transmission activities may begin immediately (or directly), as the data will be properly aligned for correct insertion into the proper $B_1$ or $B_2$ channels.

Figure 7:
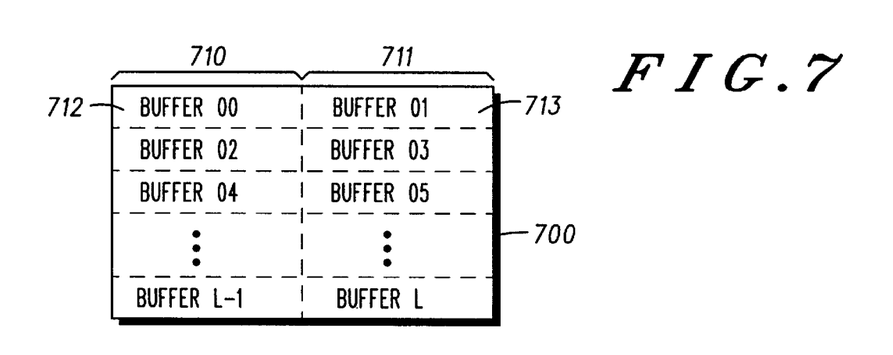
FIG. 7 is a block diagram illustrating an exemplary memory structure for a buffer in accordance with the present invention.

FIG. 7 is a block diagram illustrating an exemplary memory structure for a buffer 700 in accordance with the present invention, such as the transmit buffer 515 and receive buffer 525 of the data SCC 420, utilized for data alignment. In the preferred embodiment, the buffer 700 is structured with an alternating byte configuration or designation, such as an odd and even designation. For example, in the buffer 700, $B_1$ data may be stored in memory having a first type designation (such as even designated bytes 710), and $B_2$ data correspondingly may be stored in memory having a second type designation (such as odd designated bytes 711). There are, of course, innumerable equivalent memory structures which may be utilized, as the only requirements are that $B_1$ data be stored in a manner distinguishable from the $B_2$ data and that the data be stored in a manner so that it is available for proper transmission by the SCC, namely, for alternating transmission of a $B_1$ byte and a $B_2$ byte. Continuing to refer to FIG. 7, when transmit data is stored for transmission, the first byte of data is stored in memory having a first type designation, illustrated as an even byte (such as BUFFER 00 byte 712), with the second byte of data stored in memory having a second type designation, illustrated as an odd byte (such as BUFFER 01 byte 713), the next byte of data stored in memory having the first type designation, the next byte of data stored in memory having the second type designation, and so on, with the process of alternating memory (or storage) locations between the first and second type designations (even and odd designated bytes) continuing as transmit data arrives for storage and subsequent transmission.

As indicated above, during set up of a bonded connection, one of the B channels will be selected as a primary or master channel, and the other B channel will (by default) be a secondary or slave channel. For ease of discussion, it may be assumed without limitation of generality that the first B time slot or $B_a$ location has been selected as the master channel. Referring to FIGS. 4, 5 and 7, in accordance with the present invention, in order to place the master channel bytes in the correct time slot (either the first time slot or the second time slot), the controller 400 generates a command to the transmitter 510 of the data SCC 420 to send a predetermined information pattern or sequence, such as a hexidecimal AAOF, to the interface transceiver 210, through the serial communications port 530. In accordance with the preferred embodiment of the present invention, the predetermined information sequence has two bytes, requiring only that the first and second bytes are distinguishable from the other, i.e., not identical, and preferably having a relatively low correlation with each other. For example, the preferred sequence AAOF forms two readily distinguishable bytes, a first byte equal to binary 10101010 and a second byte equal to binary 00001111. Next, the interface transceiver 210 is placed in a loopback mode (or transparent loopback mode) and the predetermined information pattern is transmitted, such that the bytes (or bits) of the transmitted sequence are returned to the receiver 520, as a received information pattern, and are stored in the receive buffer 525. In the preferred embodiment, the receiver 520 stores the first byte received (of the received information pattern) in a memory location of the receive buffer 525 corresponding to the memory location in the transmit buffer 515 of the first transmitted byte: if the first transmit byte has been stored in a second type designation, such as an odd location, then the first received byte is also stored in a second type designation, in this case, an odd location. Given that in the preferred embodiment, as mentioned above, the first transmit byte is stored in an even byte location, the first received byte is correspondingly stored in the even byte location of the receive buffer 525, the second received data byte stored in the odd byte location of the receiver buffer 525, and so on. The various transmit and receive bytes could also be stored in other alternate locations, provided simply that the first transmitted byte may be compared with the first received byte. If the byte of transmit data stored in memory having a first type designation (such as an even location of the transmit buffer 515) matches the byte of receive data stored in memory having a first type designation (such as an even location of the receive buffer 525), then the current data alignment is proper, namely, master channel transmissible data has been transmitted correctly in the time slot designated for the master channel.

If a match has not occurred, however, the improper alignment can be cured through an alternate data alignment, such as by switching or shifting the locations of the $B_1$ data and $B_2$ data. For example, if a match has not occurred, then the transmissible data stored in memory having the first type designation (such as an even location) may be exchanged or switched with the transmissible data stored in memory having the second type designation (such as an odd location), thereby realigning the data for proper transmission in the $B_1$ and $B_2$ channels. As another example when a match has not occurred, data alignment can be achieved by inserting or "stuffing" a meaningless byte in the transmit buffer 515 before transmitting data, which causes the sequence of transmissible data to shift by one byte. This process of inserting forces the master channel byte to shift to the next available B channel slot, thereby causing the master channel byte to be inserted into the second time slot instead of the first time slot, or to be inserted into the first time slot instead of the second time slot. Given the alternating bytes of $B_1$ and $B_2$ transmissible data, and because there are only two possible B channel time slots for data insertion, a shift of one time slot due to the insertion of an extra byte will correct the previously erroneous alignment. If the alignment were already correct or has now been corrected, data transmission activities may proceed, for example, by reconfiguring the interface transceiver 210 for a transmission mode (rather than continuing in the loopback mode), proceeding with any protocols or training procedures, and commencing data transmission. The various comparison and matching steps may be programmed (through a set of program instructions) to occur in either the IMP 200 or the communications processor 320, with any resulting transmissible data shifting or switching occurring in the transmit buffer 515.

The degree of identity required between the predetermined information pattern and the received information pattern, for determination of a match, may be determined empirically or set at a predetermined value based upon an assumed or actual bit error rate. Assuming some possibility of bit errors, the predetermined information pattern may be chosen to minimize the possibility of an erroneous detection of a match or of a mismatch (the occurrence of false positives and false negatives). In the preferred embodiment of the present invention, a match occurs when each bit of the predetermined information pattern is completely (100%) or otherwise exactly identical (or equal) to the corresponding bit of the received information pattern, for all bits of the patterns. If any corresponding transmit and receive bit differs from the other, a match is deemed not to have occurred.

In summary, FIGS. 2–7 disclose an apparatus 101 for data transmission on bonded data channels in a digital telecommunications network, such as ISDN network 104. The apparatus 101 includes an interface transceiver 210 coupleable to the digital communications network for data transmission, with the interface transceiver 210 having a transmission mode and having a loopback mode; interface circuitry 220 coupleable to data terminal equipment 100 to receive transmissible data from the data terminal equipment; and an integrated multiprotocol processor 200 coupled to the interface transceiver 210 and to the interface circuitry 220, the integrated multiprotocol processor 200 having a serial communications controller 420 for data transmission on the bonded data channels, the integrated multiprotocol processor 200 responsive through a set of program instructions to configure the interface transceiver 210 in the loopback mode and transmit a predetermined information pattern in the loopback mode to form a received information pattern. The integrated multiprotocol processor 200 is then further responsive to compare the received information pattern with the predetermined information pattern to determine whether the received information pattern matches the predetermined information pattern and when the received information pattern does not match the predetermined information pattern, to shift the transmissable data into an alternate configuration, and with the integrated multiprotocol processor 200 further responsive to reconfigure the interface transceiver 210 for transmission mode and to commence with a data transmission activity. In addition, the integrated multiprotocol processor 200 may be further responsive to form a first configuration of the transmissible data stored in the transmit buffer 515, the first configuration having bytes of transmissible data sequentially alternating between a first type designation and a second type designation; and to form the alternate configuration by interchanging bytes of transmissible data having the first type designation stored in the transmit buffer 515 with bytes of transmissible data having the second type designation stored in the transmit buffer 515. Alternatively, the integrated multiprotocol processor 200 may be further responsive to form the alternate configuration by inserting an additional byte, such as a meaningless byte, at the beginning of a sequence of the transmissible data and shifting the sequence of all transmissible data stored in the transmit buffer 515 by one byte.

Figure 8:
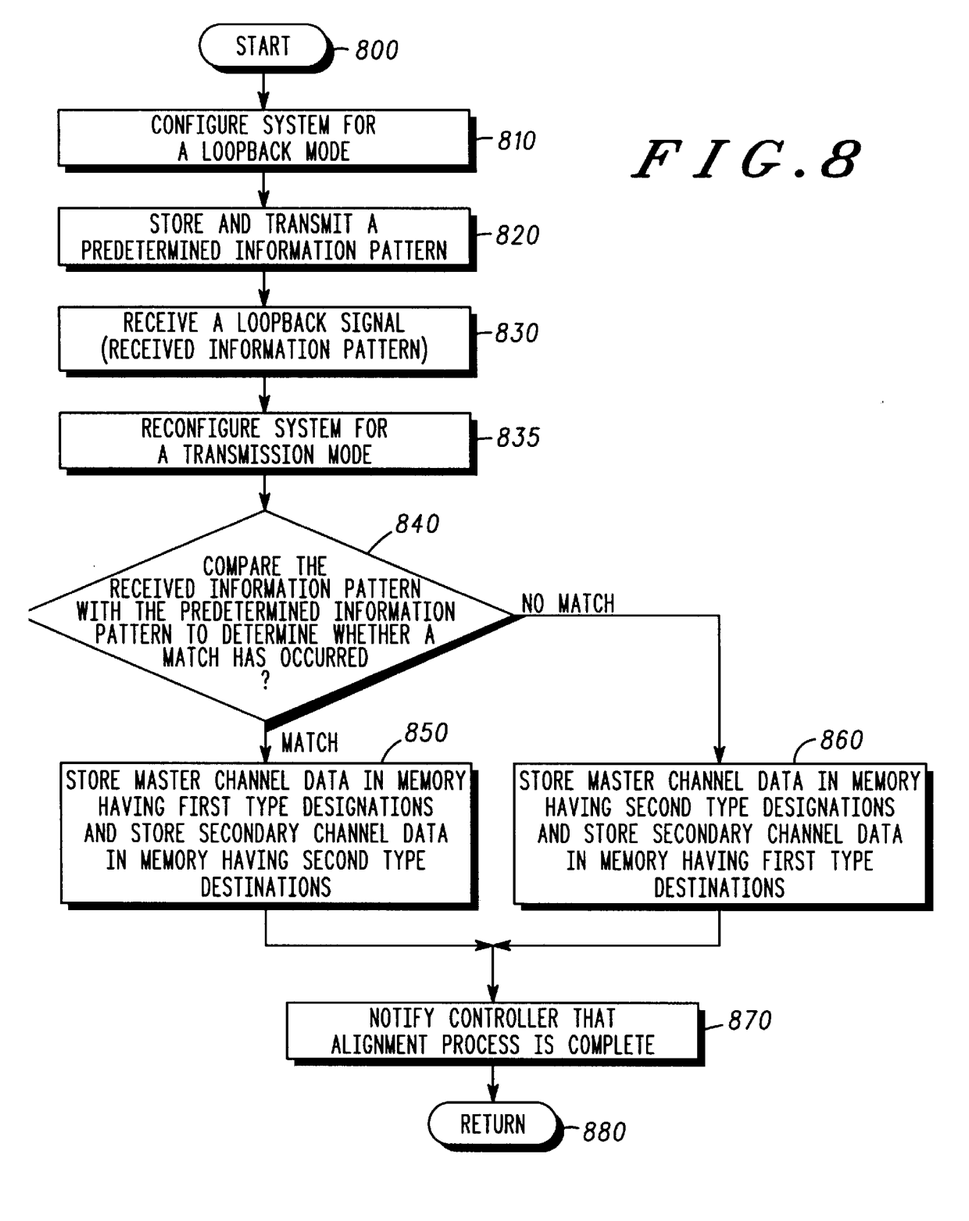
FIG. 8 is a flow diagram illustrating a method for data transmission on bonded data channels, utilizing a single serial communications controller, in accordance with the present invention.

FIG. 8 is a flow diagram illustrating a method for data transmission on bonded B channels, utilizing a single serial communications controller, in accordance with the present invention. Upon determining that a bonded connection has been requested, the method starts, step 800. Next, the data communication device is configured for loopback mode, step 810, typically through the controller 400 (within the IMP 200) instructing the interface transceiver 210 to enter a loopback mode. A predetermined information pattern, such as the sequence AAOF, is stored in the transmit buffer 515 and transmitted, step 820. A loopback signal (or sequence) is then received (and is also referred to as a received information pattern) in step 830. As mentioned above, the received information pattern is typically received by the receiver 520 from the interface transceiver 210 and stored in the receive buffer 525. At this time, the interface transceiver 210 may also be reconfigured for a transmission mode (non-loopback mode), step 835. This reconfiguration step may also occur later in the process (such as subsequent to step 870 below) and any time prior to data transmission activities. The received information pattern is compared with the predetermined information pattern (which had been transmitted), to determine whether the received information pattern matches the predetermined information pattern, step 840. If there have been no bit errors during the loopback and if a match were to occur, in the preferred embodiment, an exact, bit for bit match could be expected. If a match has occured in step 840, indicating proper data alignment, the master channel data is loaded or stored in memory having the first type designation or storage locations (such as even locations of the transmit buffer 515), and the secondary channel data is loaded in memory having the second type designations (such as odd locations of the transmit buffer 515), step 850. When a match has not occurred in step 840, the master channel data is stored in memory having the second type designations (such as odd locations of the tranmit buffer 515), and the secondary channel data is loaded in memory having the first type designations (such as even locations of the tranmit buffer 515), step 860. When either step 850 or step 860 is complete, then the contoller 400 is notified that the alignment (or realignment) process is complete, step 870. The alignment process has then been completed, return step 880, and data transmission activities may commence, with the local terminal adapter 101 now being ready to receive data from the local DTE 100 and transfer data to the remote terminal adapter 102 on the bonded data channels.

In the preferred embodiment, utilizing a buffer 700 having even and odd designations form memory locations as illustrated in FIG. 7, when the first time slot is designated for the master channel, a match requires insertion of the master channel data in the even locations of the transmit buffer 515, or if no match has occurred, placing the master channel data in the odd memory locations of the transmit buffer 515. When the second time slot is designated for the master channel, a match requires insertion of the master channel data in the odd locations of the transmit buffer 515, or if no match has occurred, placing the master channel data in the even memory locations of the transmit buffer 515.

In summary, FIG. 8 illustrates a method for data transmission on a bonded channel in a digital telecommunications network utilizing a single serial communications controller, with the method including: (a) transmitting a predetermined information pattern in a loopback mode to form a received information pattern, steps 810, 820 and 830; (b) comparing the received information pattern with the predetermined information pattern to determine whether the received information pattern matches the predetermined information pattern, step 840; (c) when the received information pattern does not match the predetermined information pattern, shifting transmissable data into an alternate configuration, step 860; and (d) commencing with a data transmission activity in a transmission mode, steps 845 and 870.

As may be apparant from the discussion above, there are numerous advantages from the apparatus and method of the present invention. First, implementation of the apparatus and method allow a terminal adapter to provide for bonded ISDN B channels utilizing a single SCC. In contrast with prior art implementations, this allows the elimination of an entire IMP from the terminal adapter, with corresponding cost savings in the manufacture and purchase of the data communication device. Secondly, the apparatus and method has provided this additional bonding capability utilizing currently available integrated multiprotocol processors. Third, the methodology of the present invention may also be expanded to other protocols and systems having time division multiplexed channels, in addition to ISDN networks.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

We claim:

1. A method for data transmission on a bonded channel in a digital telecommunications network utilizing a single serial communications controller, the method comprising:
   (a) transmitting a predetermined information pattern in a loopback mode to form a received information pattern;
   (b) comparing the received information pattern with the predetermined information pattern to determine whether the received information pattern matches the predetermined information pattern;
   (c) shifting transmissible data into an alternate configuration when the received information pattern does not match the predetermined information pattern; and
   (d) commencing with a data transmission activity in a transmission mode;
   wherein step (b) further comprises:
      (b1) comparing a first byte of the received information pattern with a first byte of the predetermined information pattern and with a second byte of the predetermined information pattern;
      (b2) comparing a second byte of the received information pattern with the first byte of the predetermined information pattern and with the second byte of the predetermined information pattern;
      (b3) determining whether the received information pattern matches the predetermined information pattern by determining whether the first byte of the received information pattern is matched to the first byte of the predetermined information pattern and whether the second byte of the received information pattern is matched to the second byte of the predetermined information pattern; and
      (b4) determining whether the received information pattern does not match the predetermined information pattern by determining whether the first byte of the received information pattern is matched to the second byte of the predetermined information pattern and whether the second byte of the received information pattern is matched to the first byte of the predetermined information pattern.

2. The method of claim 1 wherein step (a) further comprises:
   (a1) storing the predetermined information pattern in a transmit buffer;
   (a2) configuring a data communication device for the loopback mode;
   (a3) transmitting the predetermined information pattern;
   (a4) receiving data to form the received information pattern; and
   (a5) storing the received information pattern in a receive buffer.

3. The method of claim 1 wherein the predetermined information pattern is a hexadecimal AA0F.

4. The method of claim 1 wherein step (c) further comprises:
   directly commencing with a data transmission activity in the transmission mode when the received information pattern matches the predetermined information pattern.

5. The method of claim 1 wherein step (b) further comprises:
   (b1) comparing each bit of the received information pattern with each bit of the predetermined information pattern; and
   (b2) determining that the received information pattern matches the predetermined information pattern when the received information pattern has complete identity with the predetermined information pattern.

6. An apparatus for data transmission on bonded data channels in a digital telecommunications network, the apparatus comprising:
   an interface transceiver coupleable to the digital communications network for data transmission, the interface transceiver having a transmission mode and having a loopback mode;
   interface circuitry coupleable to data terminal equipment to receive transmissible data from the data terminal equipment;
   an integrated multiprotocol processor coupled to the interface transceiver and to the interface circuitry, the integrated multiprotocol processor having a serial communications controller for data transmission on the bonded data channels, the integrated multiprotocol processor responsive through a set of program instructions to configure the interface transceiver in the loopback mode and transmit a predetermined information pattern in the loopback mode to form a received information pattern; the integrated multiprotocol processor further responsive to compare the received information pattern with the predetermined information pattern to determine whether the received information pattern matches the predetermined information pattern and when the received information pattern does not match the predetermined information pattern, to shift the transmissable data into an alternate configuration; and the integrated multiprotocol processor further responsive to reconfigure the interface transceiver for the transmission mode and to commence with a data transmission activity.

7. The apparatus of claim 6 wherein the serial communication controller further comprises a transmitter, a transmit buffer, a receiver, a receive buffer, and a controller interface.

8. The apparatus of claim 7 wherein the integrated multiprotocol processor is further responsive to store the predetermined information pattern in the transmit buffer and to store the received information pattern in the receive buffer.

9. The apparatus of claim 7 wherein the integrated multiprotocol processor is further responsive to form a first configuration of the transmissible data stored in the transmit buffer, the first configuration having bytes of transmissible data sequentially alternating between a first type designation and a second type designation; and to form the alternate configuration by interchanging bytes of the transmissible data having the first type designation stored in the transmit buffer with bytes of the transmissible data having the second type designation stored in the transmit buffer.

10. The apparatus of claim 9 wherein the first type designation is an even buffer location and the second type designation is an odd buffer location.

11. The apparatus of claim 7 wherein the integrated multiprotocol processor is further responsive to form the alternate configuration by inserting an additional byte at a beginning of a sequence of the transmissible data stored in the transmit buffer and shifting the sequence of the transmissible data stored in the transmit buffer by one byte.

12. The apparatus of claim 11 wherein the additional byte is designated as meaningless.

13. The apparatus of claim 7 wherein the integrated multiprotocol processor is further responsive to compare each bit of the received information pattern stored in the receive buffer with each bit of the predetermined information pattern stored in the transmit buffer, and to determine that the received information pattern matches the predetermined information pattern when the received information pattern has complete identity with the predetermined information pattern.

14. The apparatus of claim 6 wherein the predetermined information pattern is a hexadecimal AAOF.

15. The apparatus of claim 6 wherein the integrated multiprotocol processor is further responsive to directly reconfigure the interface transceiver for the transmission mode and commence with a data transmission activity when the received information pattern matches the predetermined information pattern.

16. An apparatus for data transmission on bonded data channels in a digital telecommunications network, the apparatus comprising:

an interface transceiver coupleable to the digital communications network for data transmission, the interface transceiver having a transmission mode and having a loopback mode;

interface circuitry coupleable to data terminal equipment to receive transmissible data from the data terminal equipment;

an integrated multiprotocol processor coupled to the interface transceiver and to the interface circuitry, the integrated multiprotocol processor having a serial communications controller for data transmission on the bonded data channels; the serial communication controller further having a transmitter, a transmit buffer, a receiver and a receive buffer; the integrated multiprotocol processor responsive through a set of program instructions to store a predetermined information pattern in the transmit buffer of the serial communications controller, configure the interface transceiver in the loopback mode, and transmit through the transmitter of the serial communications controller the predetermined information pattern in the loopback mode, to receive through the receiver of the serial communications controller a loopback signal forming a received information pattern, and to store the received information pattern in the receive buffer of the serial communications controller; the integrated multiprotocol processor further responsive to compare the received information pattern with the predetermined information pattern to determine whether the received information pattern matches the predetermined information pattern and when the received information pattern does not match the predetermined information pattern, to shift the transmissable data into an alternate configuration and to store the transmissible data in the alternate configuration in the transmit buffer of the serial communication controller; and the integrated multiprotocol processor further responsive to reconfigure the interface transceiver for the transmission mode and to commence with a data transmission activity.

17. The apparatus of claim 16 wherein the integrated multiprotocol processor is further responsive to form a first configuration of the transmissible data stored in the transmit buffer, the first configuration having bytes of the transmissible data sequentially alternating between a first type designation and a second type designation; and to form the alternate configuration by interchanging bytes of the transmissible data having the first type designation stored in the transmit buffer with bytes of the transmissible data having the second type designation stored in the transmit buffer.

18. The apparatus of claim 16 wherein the integrated multiprotocol processor is further responsive to insert an additional byte at a beginning of a sequence of the transmissible data stored in the transmit buffer and shift the sequence of the transmissible data stored in the transmit buffer by one byte.

19. The apparatus of claim 16 wherein the integrated multiprotocol processor is further responsive to compare each bit of the received information pattern stored in the receive buffer with each bit of the predetermined information pattern stored in the transmit buffer, and to determine that the received information pattern matches the predetermined information pattern when the received information pattern has one hundred percent identity with the predetermined information pattern.

20. A method for data transmission on a bonded channel in a digital telecommunications network utilizing a single serial communications controller, the method comprising:

(a) transmitting a predetermined information pattern in a loopback mode to form a received information pattern;

(b) comparing the received information pattern with the predetermined information pattern to determine whether the received information pattern matches the predetermined information pattern;

(c) shifting transmissable data into an alternate configuration when the received information pattern does not match the predetermined information pattern; and (d) commencing with a data transmission activity in a transmission mode;

wherein step (c) further comprises:

(c1) forming a first configuration of the transmissible data, the first configuration having bytes of the transmissible data sequentially alternating between a first type designation and a second type designation; and (c2) forming the alternate configuration by interchanging bytes of the transmissible data having the first type designation with bytes of the transmissible data having the second type designation.

21. The method of claim 20 wherein the first type designation is an even buffer location and the second type designation is an odd buffer location.

* * * * *